United States Patent [19]

Mifsud

[11] 4,161,229
[45] Jul. 17, 1979

[54] HYDRAULIC SYNCHRONIZING SYSTEM FOR COORDINATING MOVEMENT OF THE VIBRATOR GUIDE RODS

[75] Inventor: Joseph F. Mifsud, Houston, Tex.

[73] Assignee: Exxon Production Research Company, Houston, Tex.

[21] Appl. No.: 802,150

[22] Filed: May 31, 1977

[51] Int. Cl.² .................. G01V 1/14; F01B 25/14
[52] U.S. Cl. .................. 181/114; 254/89 H; 91/171; 91/515
[58] Field of Search .......... 181/114; 254/89 H; 91/171, 358 A, 411 A, 412; 60/426, 580

[56] References Cited

U.S. PATENT DOCUMENTS

| | | | |
|---|---|---|---|
| 2,846,186 | 8/1958 | Smith | 254/89 H |
| 2,938,351 | 5/1960 | Brooks | 91/412 |
| 2,984,072 | 5/1961 | Born | 254/89 H |
| 3,019,735 | 2/1962 | Moeller et al. | 91/411 A |
| 3,059,431 | 10/1962 | Munschauer, Jr. et al. | 91/171 |
| 3,265,357 | 8/1966 | Schilling | 254/89H |
| 3,306,391 | 2/1967 | Bays | 181/114 |
| 3,355,993 | 12/1967 | Williamson | 91/171 |
| 3,850,081 | 11/1974 | Joelson | 91/171 |

FOREIGN PATENT DOCUMENTS 890525 3/1962 United Kingdom ............. 91/171

Primary Examiner—Maynard R. Wilbur
Assistant Examiner—Lawrence Goodwin
Attorney, Agent, or Firm—E. Eugene Thigpen

[57] ABSTRACT

A hydraulic synchronizing system which comprises a double piston power source and a drain valve in fluid communication with the hydraulic lift cylinders of a vehicle mounted vibratory seismic energy source. The double piston power source supplies the hydraulic lift cylinders with substantially equal volumes of hydraulic fluid, and the drain valve adjusts the flow of hydraulic fluid out of the hydraulic lift cylinders. The system synchronizes the operation of the hydraulic lift cylinders and thus coordinates movement of the vibrator guide rods relative to the vehicle upon which the vibrator is mounted.

3 Claims, 3 Drawing Figures

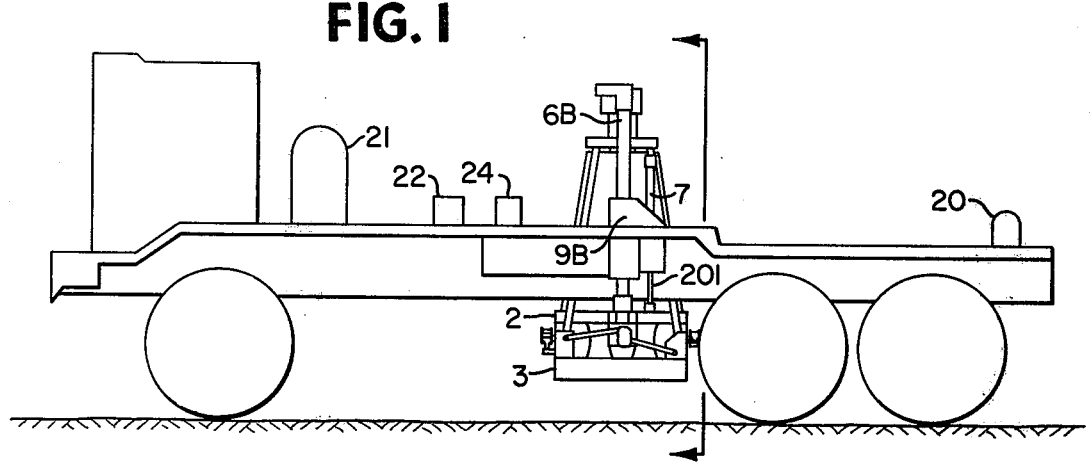// FIG. 1
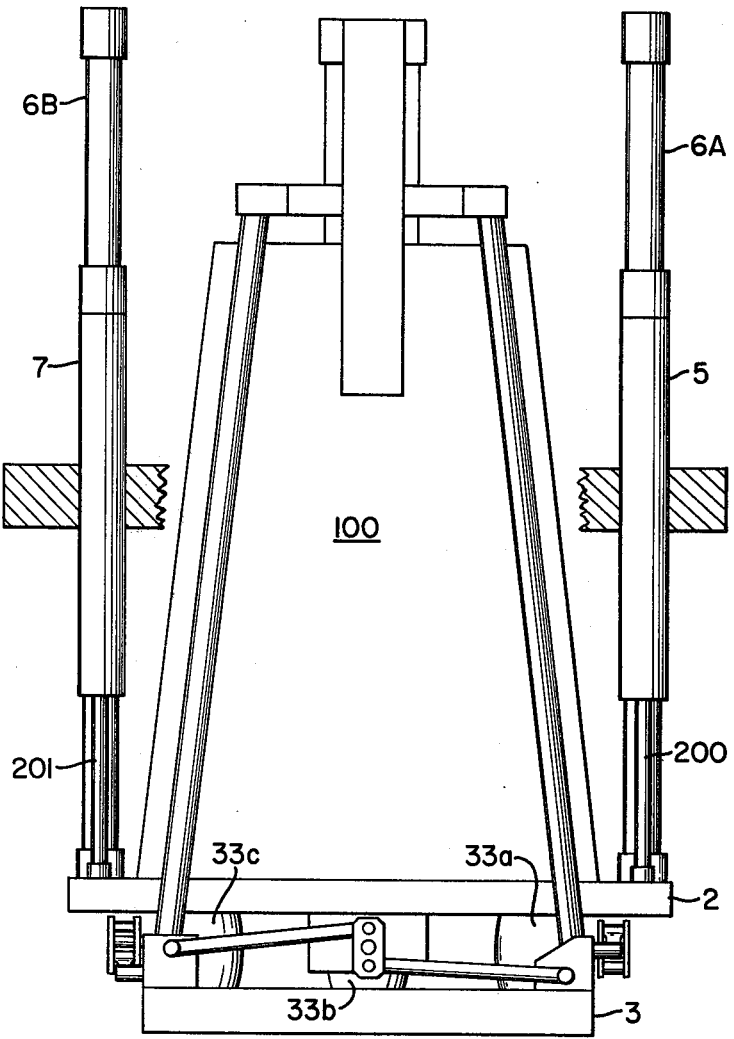// FIG. 2

HYDRAULIC SYNCHRONIZING SYSTEM FOR COORDINATING MOVEMENT OF THE VIBRATOR GUIDE RODS

BACKGROUND OF THE INVENTION

1. Field of the Invention

The present invention relates to vibratory seismic energy sources used for seismic prospecting. More particularly, it relates to a system for synchronizing operation of the hydraulic lift cylinders and thus coordinating movement of the guide rods of a seismic vibrator.

2. Description of the Prior Art

In seismic prospecting, it has become common to use, as a source of elastic waves, an electrohydraulically operated vibratory source, more simply referred to as a vibrator.

Typically, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder, thereby imparting a reciprocating motion to the piston relative to the reaction mass. The piston rod extending from the reaction mass is rigidly coupled to a ground coupling plate (hereinafter baseplate) which is maintained in intimate contact with the earth material. The inertia of the reaction mass tends to resist displacement of the reaction mass relative to the earth. The motion of the piston is coupled through the piston rod and baseplate to impart vibratory seismic energy in the earth.

Typically, the vibrator is vehicle mounted. The baseplate is retractably positioned beneath the vehicle and is raised and lowered by a vibrator lift system. To prevent decoupling of the baseplate from the ground during operation a portion of the vehicle's weight is applied to the baseplate through a supporting means. The supporting means supports the weight of the vehicle, and may consist of a support structure positioned above the baseplate and one or more spring members affixed between the support structure and the baseplate. The vibrator lift system raises and lowers the vehicle so as to apply at least a portion of the vehicle's weight to the baseplate. The vibrator lift system usually comprises a pair of hydraulic lift cylinders, a pair of guide rods and a synchronizing system. The hydraulic lift cylinders control the vertical position of the baseplate relative to the vehicle and apply the weight of the vehicle to the baseplate. The guide rods laterally maintain the baseplate relative to the center of the vehicle. The synchronizing system insures the coordinated movement of the guide rods relative to the vehicle.

Various systems have been used to insure that the guide rods move up and down in unison. Where the guide rods have extended above the vibrator, they have been mechanically interconnected by a rigid stress member so as to coordinate their movement. Another mechanical synchronizing system (See U.S. Pat. No. 3,929,206, Bedenbender et al, issued Dec. 30, 1975) consists of a chain and sprocket arrangement interconnecting the guide rods, wherein the chain from one guide rod runs over a sprocket at one end of a synchronization shaft and the chain from the other guide rod runs over a sprocket at the opposite end of this shaft. An unequal force on one of the guide rods produces through its chain and sprocket arrangement a moment on the synchronization shaft which is transferred through the chain and sprocket arrangement of the other rod to equalize the load bearing force between guide rods.

A type of hydraulic system which obviates the necessity of mechanically interconnecting the guide rods has also been used to equalize travel between the guide rods. (See U.S. Pat. No. 3,306,391, Bays, issued Feb. 28, 1967). This system is comprised primarily of two double-rod-end hydraulic synchronizing cylinders disposed on opposite sides of the vibrator. On either side of the vibrator, a cross-piece extends from the guide rod and mechanically interconnects the synchronizing cylinder and the hydraulic lift cylinder. Nonanalogous chambers of the synchronizing cylinders are connected in fluid communication. The force exerted by the hydraulic lift cylinder is transferred through the cross-piece to the synchronizing cylinder. An unequal force exerted on one hydraulic lift cylinder will cause transfer of hydraulic fluid from one synchronizing cylinder to the other. Movement of either of the pistons of the synchronizing cylinders will cause a corresponding movement in the opposite synchronizing cylinder; thus, movement of either of the guide rods will of necessity result in a corresponding movement of the other guide rod.

SUMMARY OF THE INVENTION

The invention is a hydraulic system for synchronizing the operation of the hydraulic lift cylinders and thus coordinating movement of the vibrator guide rods relative to the vehicle upon which the vibrator is mounted.

A source of hydraulic fluid, which may be a double-piston power source, provides the working chambers of the two hydraulic lift cylinders with equal volumes of hydraulic fluid. A drain valve moves in response to pressure differentials existing between the working chambers of the lift cylinders, and restricts the flow of hydraulic fluid out the non-working chambers of the lift cylinders. If the pressure in the working chamber of one hydraulic lift cylinders is greater than the pressure in the working chamber of the other hydraulic cylinder, the drain valve will restrict the flow of hydraulic fluid out of the non-working chamber of the hydraulic lift cylinder having the lower pressure within its working chamber. This flow restriction induces an increased pressure in the working chamber with the lower pressure thereby acting to equalize the pressure in the working chambers of the two hydraulic lift cylinders. The double-piston power source, the lift cylinders and the drain valve are interconnected by fluid conduits and valves for appropriate fluid flow.

By supplying the lift cylinders with substantially equal volumes of hydraulic fluid and by maintaining the working chambers at substantially the same pressure, movement of the lift cylinders will be synchronized and thus movement of the guide rods with respect to the vehicle will be coordinated. Coordinating movement of the guide rods prevents the guide rods from seizing and thereby damaging the vibrator.

BRIEF DESCRIPTION OF THE DRAWINGS

FIG. 1 illustrates a vibrator mounted on a vehicle.

FIG. 2 is a cross-sectional view along plane 2—2 of FIG. 1.

DESCRIPTION OF THE PREFERRED EMBODIMENT

Figure 3:
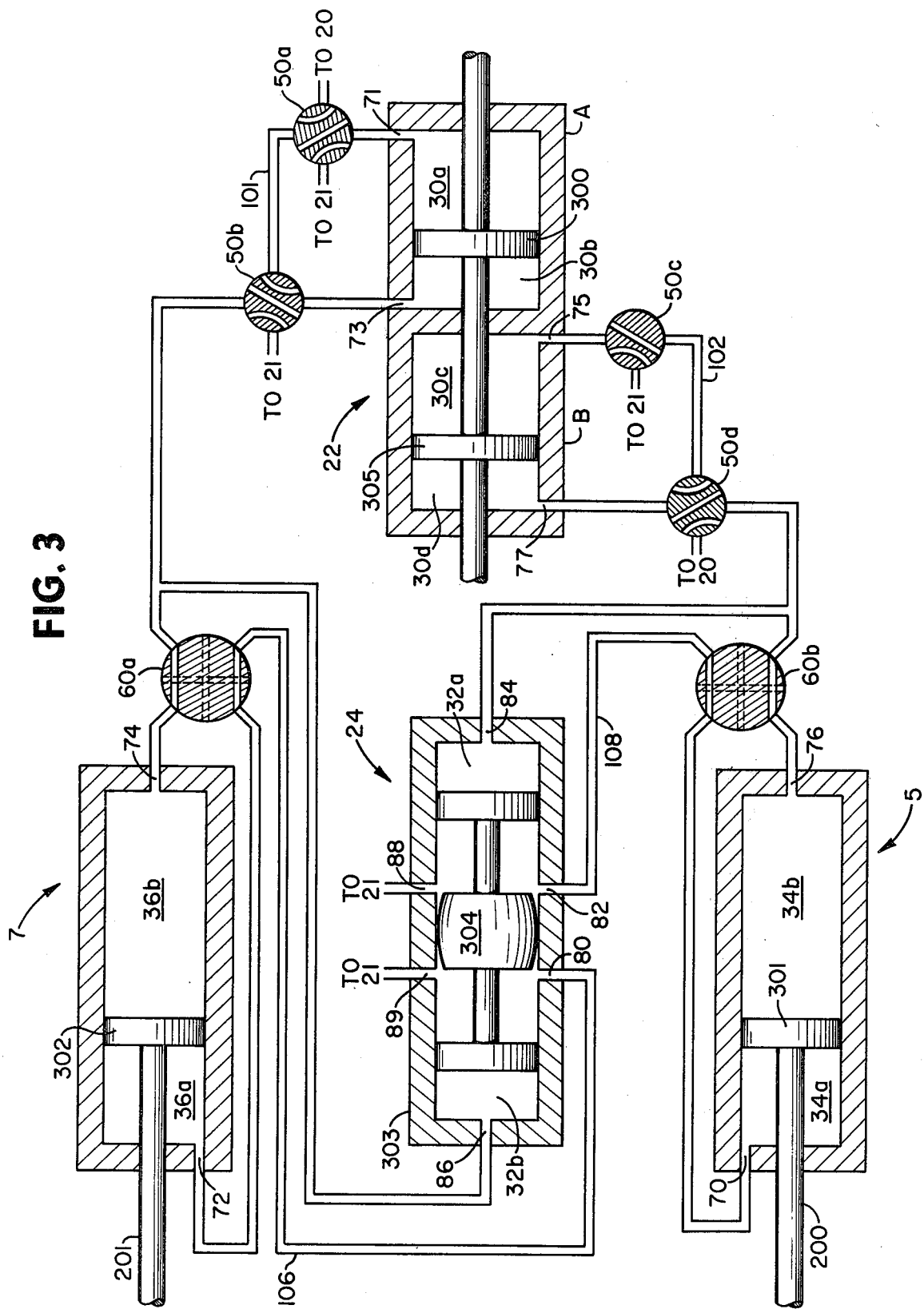
FIG. 3 is a schematic hydraulic diagram of the hydraulic synchronizing system for the vibrator shown in FIG. 1.

FIG. 1 shows baseplate 3 of a seismic vibrator. The vibrator may be of a type known to those familiar with the prior art; therefore, many details of the structure thereof are not included in the drawing. Normally, however, the baseplate is driven by a hydraulic drive mechanism comprising a driving piston reciprocally mounted within a cylinder bore, and a piston rod. The lower end of the piston rod is affixed to the center of the baseplate.

A pair of lift cylinder assemblies, hydraulic lift cylinders 5 and 7 (see FIGS. 1 and 2), transfer the weight of the vehicle to a support structure, such as hold-down plate 2. Hold-down plate 2 extends beneath the reaction mass 100 and rests upon four air bags 33a, 33b, 33c and 33d (33d is not shown), which are affixed between the hold-down plate and the baseplate.

Hydraulic lift cylinders 5 and 7 control the vertical position of the vibrator relative to the vehicle. The cylinder housings of lift cylinders 5 and 7 may be affixed to the vehicle frame and the piston rods thereof affixed to the hold-down plate. When hydraulic fluid is supplied to the upper chambers of lift cylinders 5 and 7, the pistons are forced down relative to the cylinders and the baseplate is lowered to the ground. After the baseplate is lowered to the earth's surface, if additional hydraulic fluid is pumped into the upper chambers of lift cylinders 5 and 7, the vehicle will be lifted off the ground and its weight will bear on the hold-down plate thus applying the weight of a heavy mass to the baseplate. The vehicle is lowered back to the ground and then the baseplate is lifted off the ground by pumping hydraulic fluid into the lower chambers of lift cylinders 5 and 7. Guide rods 6A and 6B (see FIGS. 1 and 2) slide through the cylindrical bores in guide frames 9A and 9B (9A is not shown) which are rigidly affixed to opposite sides of the transport vehicle.

The novel hydraulic synchronizing system of this invention equalizes operation of the hydraulic lift cylinders and thus coordinates movement of the guide rods relative to the vehicle. It will be appreciated that if the baseplate 3 comes to rest upon uneven ground or if a portion of it comes to rest upon a protruding rock or log or if there is uneven distribution of the lowering force, an unequal force on the hydraulic lift cylinders will result. If this unequal force is not adjusted for, one hydraulic lift cylinder will move at a faster rate than the other and movement of the guide rods will not be coordinated. Such unequal motion could result in seizing or binding of the guide rods. The function of this invention is to synchronize movement of the hydraulic lift cylinders and thus coordinate movement of the guide rods with respect to the vehicle.

With reference to FIGS. 1 and 3, the hydraulic synchronizing system primarily comprises a double piston power source 22 and a drain valve 24 in fluid communication with hydraulic lift cylinders 5 and 7. The double-piston power source will consist of two piston and cylinder assemblies of essentially the same geometric dimensions rigidly interconnected so that each piston will have the same movement. The double piston power source 22 may be constructed as illustrated in FIG. 3. Piston 300 divides first cylinder A into chambers 30a and 30b, and piston 305 divides second cylinder B into chambers 30c and 30d. Chambers 30a, 30b, 30c, and 30d are connected by hydraulic ports 71, 73, 75, and 77, respectively, to hydraulic valves 50a, 50b, 50c, and 50d. Valve 50a is connected by hydraulic conduit 101 to valve 50b, and valve 50c is connected by conduit 102 to valve 50d. Hydraulic high pressure source 20 is connected by hydraulic conduit to valves 50a and 50d. Hydraulic oil reservoir 21 is connected by conduit to valves 50a, 50b, and 50c.

Hydraulic lift cylinder 7 (see FIG. 3) has a piston 302 therein affixed to piston rod 201. Piston 302 divides cylinder 7 into a lower chamber 36a and an upper chamber 36b, the chambers containing hydraulic ports 72 and 74, respectively. Hydraulic lift cylinder 5 has a piston 301 therein connected to piston rod 200. Piston 301 divides cylinder 5 into a lower chamber 34a and an upper chamber 34b, the chambers containing hydraulic ports 70 and 76, respectively. Piston rods 200 and 201 are connected to opposite sides of the hold-down plate.

The working chambers of hydraulic lift cylinders 5 and 7 are the chambers, depending on the mode of operation, to which the hydraulic fluid is supplied by double-piston power source 22. The other chambers of hydraulic lift cylinders 5 and 7 may be called non-working chambers and they are in fluid communication with hydraulic oil reservoir 21 by means of drain valve 24.

Drain valve 24 comprises a cylinder 303 with a piston valve 304 slidably positioned therein. The piston valve 304 forms, at either end of the cylinder, chambers 32a and 32b containing hydraulic ports 84 and 86, respectively. Port 84 is in fluid communication with the working chamber of lift cylinder 5 and the double-piston power source. Port 86 is in fluid communication with the working chamber of lift cylinder 7 and the double-piston power source. Hydraulic ports 80 and 89, laterally positioned within cylinder 303, form a fluid passageway which provides fluid communication between oil reservoir 21 and the non-working chamber of lift cylinder 7, allowing hydraulic fluid to flow through the drain valve and thus to the oil reservoir. Likewise, hydraulic ports 82 and 88, laterally positioned within cylinder 303, form a fluid passageway which provides fluid communication between oil reservoir 21 and the non-working chamber of lift cylinder 5.

The function of the double-piston power source 22 is to assure that the working chambers of the two hydraulic lift cylinders 5 and 7 are supplied with equal volumes of hydraulic fluid. Equal movement of pistons 300 and 305 (see FIG. 3) will generate equal volumes of hydraulic fluid flow to the working chambers of the lift cylinders. Since the hydraulic lift cylinders control the position of the guide rods, it is necessary that the pistons of the two hydraulic cylinders have the same movement, in order to synchronize movement of the guide rods. The role of drain valve 24 is to adjust the flow of hydraulic fluid out of the non-working chambers of the hydraulic lift cylinders so that the pressure in the working chamber of lift cylinder 7 is substantially equal to the pressure in the working chamber of lift cylinder 5. If equal volumes of hydraulic fluid are supplied to the two hydraulic lift cylinders at the same pressure, the two lift cylinders will, therefore, move together and thus coordinate movement of the guide rods relative to the vehicle.

When lowering the baseplate 3 from its raised or traveling position, piston shafts 200 and 201 of lift cylinders 5 and 7 (see FIGS. 2 and 3), respectively, tend to move down toward the earth, port 74 of lift cylinder 7 is connected through crossover valve 60a and valve 50b to port 73 of power source 22, and port 76 of lift cylinder 5 is connected through crossover valve 60b and valve 50d to port 77 of power source 22. Ports 71 and 75 of power source 22 are connected through valves 50a and 50c, respectively, to reservoir 21. Port 80 of drain valve 24 is connected through conduit 106 and valve 60a to port 72 of lift cylinder 7, and port 82 is connected through conduit 108 and valve 60b to port 70 of lift cylinder 5. This configuration will cause fluid to be supplied to chamber 36b of lift cylinder 7 and chamber 34b of lift cylinder 5 and permit the drain valve to adjust the pressure in chambers 34b and 36b in order to synchronize movement of the lift cylinders. In this configuration the fluid pressure in chambers 30d, 34b and 32a are essentially equal. Likewise, the fluid pressure in chambers 30b, 36b and 32b are essentially equal.

In lowering the baseplate, should one hydraulic lift cylinder move at a faster rate than the other, the pressure in chambers 30d, 34b and 32a will not equal the pressure in chambers 30b, 36b and 32b. The drain valve will respond to this pressure differential and adjust the pressure in chambers 36a and 34a such that the pressure in chambers 36b and 34b become substantially equal allowing the hydraulic lift cylinders to move in unison. For example, should piston 302 of hydraulic lift cylinder 7 move downward at a faster rate than piston 301 of hydraulic lift cylinder 5, the pressure in chambers 30d, 34b, and 32a will be greater than the pressure in chambers 30b, 36b and 32b. Since the pressure in chamber 32a is greater than the pressure in chamber 32b, the piston valve 304 will move to the left (see FIG. 3) tending to block ports 80 and 89, which tends to retard movement of piston 302 in lift cylinder 7. This occurs because the transfer of fluid out of chamber 36a to reservoir 21 through ports 80 and 89 is restricted by the movement of piston valve 304 to the left. When piston valve 304 is in this position, the pressure in chamber 36b of lift cylinder 7 will tend to increase, movement of piston 302 being retarded, until it is greater than the pressure in chamber 34b of lift cylinder 5. Then piston valve 304 will tend to move to the right because the pressure in chamber 32b is greater than the pressure in chamber 32a. This will tend to block ports 82 and 88 which tends to retard movement of piston 301 of lift cylinder 5. The movement of piston valve 304 between the fluid passageways formed by ports 80 and 89 and ports 82 and 88 acts to equalize the fluid pressure in chambers 34b and 36b such that movement of the lift cylinders will be synchronized.

If the baseplate 3 is being lowered onto sloping ground, which slopes downwardly from left to right, for example, the left side of the baseplate will come in contact with the ground first, inhibiting further downward movement of piston 302 of lift cylinder 7. This will cause the pressure in chamber 36b to be greater than the pressure in chamber 34b and thus the pressure in chamber 32b will be greater than the pressure in chamber 32a. Therefore, the piston valve 304 will move to the right (see FIG. 3) blocking ports 82 and 88 which will tend to prevent any further movement of piston 301 of lift cylinder 5. At this point, the baseplate will tend to remain in a stationary condition.

The vehicle is then lifted off the ground by pumping additional hydraulic fluid into chambers 34b and 36b of lift cylinders 5 and 7, respectively. To accomplish this, port 71 of power source 22 is connected through valve 50a to hydraulic high pressure source 20. This will increase the force on pistons 301 and 302 such that the vehicle is lifted off the ground and a portion of its weight is applied to the baseplate.

If during lifting of the vehicle, the vehicle is located on ground sloping downwardly from right to left, the right side of the baseplate will be in contact with the earth's surface and a greater load will therefore be applied to lift cylinder 5. This will cause the pressure in chamber 34b to be greater than the pressure in chamber 36b; therefore, the pressure in chamber 32a will be greater than the pressure in chamber 32b. Piston valve 304 will then move to the left tending to block ports 80 and 89, which retards the flow of hydraulic fluid out of chamber 36a and thus restraining movement of piston 302. Piston 301, however, will continue to travel downward and thus the pressure in chamber 32a will become less than the pressure in chamber 32b, causing piston valve 304 to move to the right blocking ports 82 and 88. By moving back and forth in this manner between ports 80, 82, 88 and 89 in response to pressure differentials in chambers 34b and 36b, and thus chambers 32b and 32a, piston valve 304 of drain valve 24 synchronizes movement of the lift cylinders and thus coordinates movement of the guide rods relative to the vehicle.

When the vehicle is lifted to its desired height, a valve will be actuated which will disconnect high pressure source 20 from port 71 thus stabilizing the system and preventing further movement of lift cylinders 5 and 7. After a particular seismic operation is completed, the vehicle will be lowered back to the ground by actuating valves 50a and 50c such that ports 71 and 75, respectively, are connected to oil reservoir 21. This will cause the weight of the vehicle to push pistons 301 and 302 of lift cylinders 5 and 7, respectively, in an upward direction. Drain valve 24 will again respond to pressure differentials in chambers 34b and 36b to synchronize movement of lift cylinders 5 and 7. As discussed above, should one lift cylinder move at a faster rate than the other there will be a corresponding movement of piston valve 304 which tends to block the fluid passageway providing fluid communication for the lower chamber of the faster moving lift cylinder. In this manner during lowering of the vehicle, movement of the lift cylinders is synchronized.

To raise the baseplate 3 off the ground and to its traveling position, port 74 is connected through valve 60a and conduit 106 to port 80. Port 76 is connected through valve 60b and conduit 108 to port 82. Port 72 is connected through valves 60a, 50b and 50a to port 71. Port 70 is connected through valves 60b, 50d and 50c to port 75. Port 77 is connected through valve 50d to high pressure source 20, and port 73 is connected through valve 50b to reservoir 21. When the high pressure source 20 supplies fluid through port 77 of double piston power source 22, pistons 301 and 302 of lift cylinders 5 and 7, respectively, will move in an upward direction raising the baseplate off the earth's surface and back into position for transport. Should one piston move at a faster rate than the other there will be a pressure differential created in drain valve 24. For example, should piston 301 travel upward at a faster rate than piston 302, the pressure in chamber 36a will be greater than the pressure in chamber 34a. This will cause the piston valve 304 (see FIG. 3) to move to the right, the pressure in chamber 32b being greater than the pressure in chamber 32a. This tends to block ports 82 and 88 and retard the flow of hydraulic fluid out of chamber 34b. As discussed above, such movement of piston valve 304 in response to pressure differentials in chambers 32a and 32b will tend to equalize movement of the lift cylinders and thus coordinate travel of the guide rods as the baseplate is raised off the ground.

The foregoing disclosure and description of the present invention is illustrative and explanatory thereof and various changes in the size, shape and materials as well as in details of the preferred embodiment may be made without departing from the spirit and scope of the invention.

What I claim is:

1. In a vibratory seismic energy source adapted to be transported on a vehicle, including a baseplate which couples seismic energy to the ground, a supporting means positioned above said baseplate for supporting the weight of the vehicle applied to said baseplate, vertically disposed column means on opposite sides of said vibratory source connected to said supporting means and secured in sliding relation to said vehicle, and a pair of lift cylinder assemblies connected to said supporting means on opposite sides of said vibratory source in parallel relation with said column means for raising and lowering said column means relative to said vehicle and for raising and lowering said vehicle as to said column means, said lift cylinder assemblies containing pistons which define said cylinders into working and non-working chambers, the improvement comprising:

hydraulic synchronizing means interconnecting said lift cylinder assemblies for coordinating vertical movement of said column means, including dual piston and cylinder means for simultaneously supplying the working chambers of said lift cylinder assemblies with substantially equal volumes of hydraulic fluid, and a valve means in fluid communication with said working chambers and responsive to pressure differentials existing between the working chambers of said lift cylinder assemblies which adjusts the flow of hydraulic fluid out of the non-working chambers of said lift cylinder assemblies so as to maintain substantially equal pressure in the working chambers of said lift cylinder assemblies.

2. In a vibratory seismic energy source adapted to be transported on a vehicle wherein seismic energy is coupled to the ground by means of a baseplate and wherein said baseplate is raised and lowered and at least a portion of the weight of said vehicle is applied to said baseplate through a supporting means positioned above said baseplate by a pair of vertically disposed lift cylinders on opposite sides of said vibratory source, said lift cylinders containing pistons which define said cylinders into working and non-working chambers with piston rods extending vertically beneath said pistons, and wherein vertically disposed guide rods are positioned on opposite sides of said vibratory source with said lift cylinders and secured to said vehicle in a sliding relation therewith so as to laterally maintain said baseplate relative to said vehicle, said piston rods and said guide rods being connected at the lower ends thereof to said supporting means, improved means for coordinating vertical movement of said guide rods relative to said vehicle which comprises:

first means for simultaneously supplying the working chambers of said lift cylinders with substantially equal volumes of hydraulic fluid, said first means comprising a double-piston power source which includes two cylinders and pistons located therein to define two chambers in each of said cylinders, each of said chambers having hydraulic ports in fluid communication with valve means for selectively providing fluid communication between said double-piston power source and the working chambers of said lift cylinders, between said double-piston power source and a hydraulic reservoir, and between said double-piston power source and a hydraulic high pressure source; and second means in fluid communication with said working chambers and responsive to a pressure difference between the working chambers of said lift cylinders to restrict the flow of hydraulic fluid out of the non-working chamber of the lift cylinder having the lower pressure within its working chamber.

3. In a vibratory seismic energy source adapted to be transported on a vehicle wherein seismic energy is coupled to the ground by means of a baseplate and wherein said baseplate is raised and lowered and at least a portion of the weight of said vehicle is applied to said baseplate through a supporting means positioned above said baseplate by a pair of vertically disposed lift cylinders on opposite sides of said vibratory source, said lift cylinders containing pistons which define said cylinders into working and non-working chambers with piston rods extending vertically beneath said pistons, and wherein vertically disposed guide rods are positioned on opposite sides of said vibratory source with said lift cylinders and secured to said vehicle in a sliding relation therewith so as to laterally maintain said baseplate relative to said vehicle, said piston rods and said guide rods being connected at the lower ends thereof to said supporting means, improved means for coordinating vertical movement of said guide rods relative to said vehicle which comprises:

first means for simultaneously supplying the working chambers of said lift cylinders with substantially equal volumes of hydraulic fluid; and second means in fluid communication with said working chambers and responsive to a pressure difference between the working chambers of said lift cylinders to restrict the flow of hydraulic fluid out of the non-working chamber of the lift cylinder having the lower pressure within its working chamber, said second means comprising a third cylinder with a piston valve slideably positioned therein, said piston valve defining chambers at either end of said third cylinder, each of said chambers in said third cylinder having a hydraulic port which provides fluid communication between said chambers and the working chambers of the lift cylinders, said third cylinder further including two fluid passageways providing fluid communication between the non-working chambers of the lift cylinders and a hydraulic reservoir, said fluid passageways being located in relation to said piston valve such that movement of said piston valve within said third cylinder in response to a pressure difference existing between the working chambers of the lift cylinders will tend to restrict the flow of hydraulic fluid through the fluid passageway providing fluid communication for the non-working chamber of the lift cylinder having the lower pressure within its working chamber while the substantially equal volumes of flow of hydraulic fluid to each of said working chambers are maintained.

* * * * *